Oct. 17, 1944.   W. L. KAUFFMAN, 2D   2,360,424
WRINGER SPRING AND ADJUSTING SCREW ASSEMBLY
Filed Jan. 30, 1941
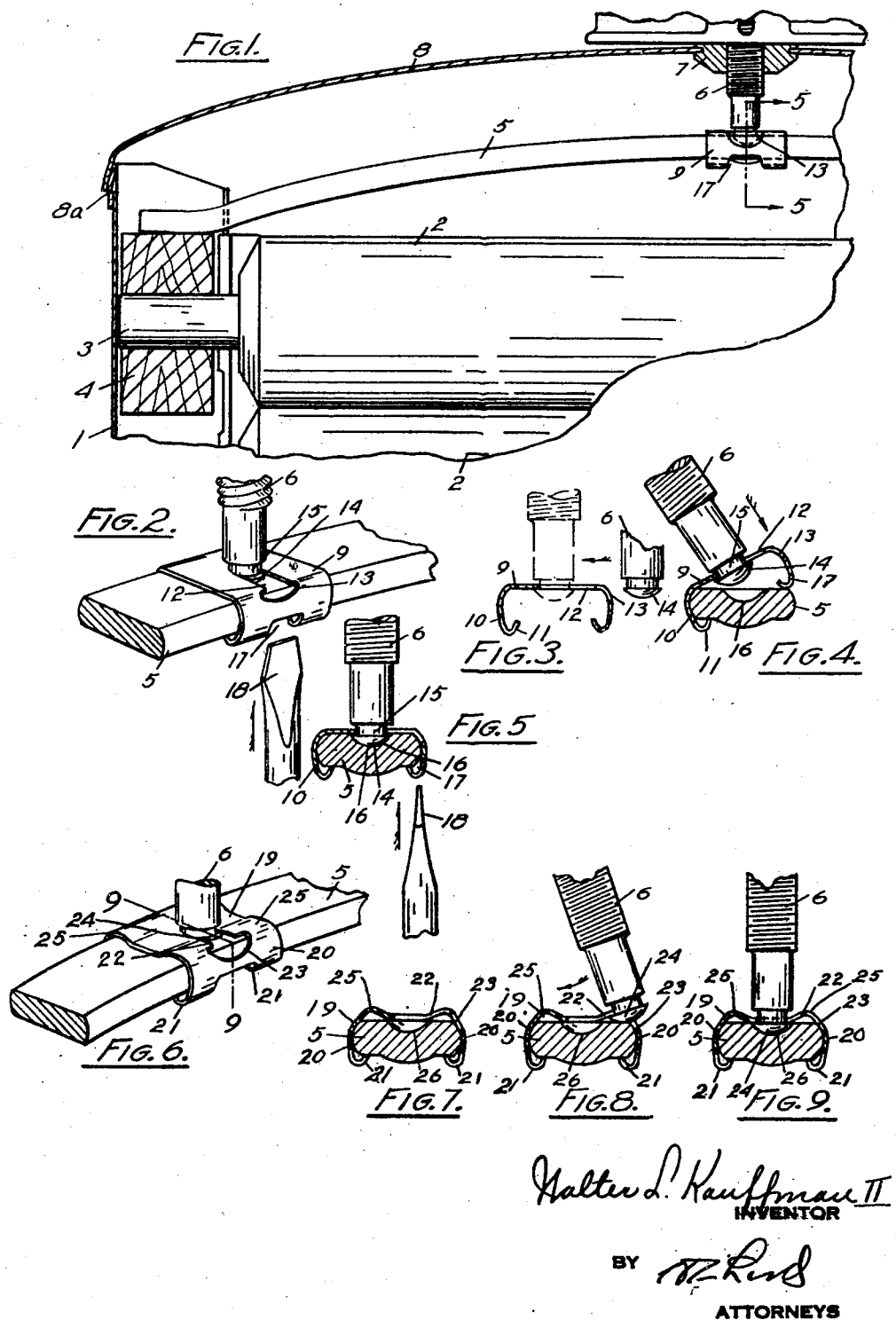

Patented Oct. 17, 1944

2,360,424

UNITED STATES PATENT OFFICE 2,360,424

WRINGER SPRING AND ADJUSTING SCREW ASSEMBLY

Walter L. Kauffman, II, Erie, Pa., assignor to Lovell Manufacturing Company, Erie, Pa., a corporation of Pennsylvania Application January 30, 1941, Serial No. 376,640

6 Claims. (Cl. 68—262)

Many wringers are supplied with a flat spring extending from one end of the wringer to the other for providing the wringer pressure on the rolls. It is common to adjust the pressure of this spring by means of a screw operating from the top of the wringer. Many wringers are provided with removable tops, the removal of the top being utilized in safety release devices for relieving pressure on the spring. It is desirable to secure the spring to the screw so that the assembly between the spring and the screw is maintained. The present invention is designed to provide a convenient means of securing the screw to the spring both as to the original assembly of the parts in the wringer and also for servicing the wringer. Features and details of the invention will appear from the specification and claims.

Preferred embodiments of the invention are illustrated in the accompanying drawing as follows:

Fig. 1 shows a central longitudinal section through a portion of the wringer.

Fig. 2 a perspective view of the spring and screw assembly.

Fig. 3 a detached view of the spring clip with the screw in position to be assembled.

Fig. 4 a view of the screw and clip in a position assumed during assembly, the pressure spring in this figure being in cross section on the line 5—5 in Fig. 1.

Fig. 5 a view showing the assembled screw, clip and spring, the spring being in section on the line 5—5 in Fig. 1.

Fig. 6 shows a perspective view of a modification.

Fig. 7 a section of the spring on the line 9—9 in Fig. 6 with the clip in elevation.

Fig. 8 a similar view with the screw partially assembled.

Fig. 9 a similar view with the screw in final position.

1 marks the wringer frame, 2 the wringer rolls, 3 a roll shaft, 4 a roll bearing for the shaft, 5 a pressure spring operating on the roll bearing, it being understood that the opposite side of the wringer has a similar bearing to that of 4 and that the spring operates on both bearings in the ordinary manner. An adjusting screw 6 operates through a nut 7 in the top. The top 8 is removable, the locking shoulders 8a permitting this removal, any common means, not shown, being provided at the opposite end of the top for completing the attachment.

A spring clip 9 is formed of spring or resilient metal. It is provided with a screw receiving portion extending over the spring which positions the screw to engage the surface of the spring and thus transmit the pressure of the adjusting screw to the spring. It also has side flanges 10 terminating in hooks 11. The resilience of the clip is such that one side of the clip may be hooked under the edge of the spring as shown in Fig. 4, and the opposite end of the clip forced downwardly to the final position. The hook forms a rounded surface assisting this movement and upon the completion of the movement is sprung under the edge of the spring locking the clip in place. A slot 12 extends through the clip laterally from the center of the clip and has an enlargement 13 arranged in the flange.

The screw has a head 14 with a neck 15, the head and neck being of such size relatively to the slot 12 and enlargement 13 as to permit the head to pass through the enlargement 13 but to engage the clip below the slot 12, the neck permitting the lateral movement of the screw to place. The spring is provided with an indenture or socket 16 which receives the head 14 when the clip is in place and locks the screw against accidental removal from the clip.

In order that the clip may be readily removed and serviced the flange at one side has a slot 17 which will readily receive any tool, such as a screw driver 18, and with this tool the flange may be pried clear of the edge of the spring so as to permit the removal.

In the modification shown in Figs. 6 to 9, the clip 19 is provided with flanges 20 and the hooks 21 adapted to engage under the edges of the spring. The clip is also provided with the laterally extending slot 22 with an enlargement 23 for receiving the head 24 of a screw in the manner that the slot in the structure of Figs. 1 to 5 receive the screw. In the modification, however, the upper part of the clip has an upward bend 25. This permits the clip to be put in place and the screw introduced as indicated in Fig. 8 after the clip is in place. In this structure, as in the structures shown in Figs. 1 to 5, the spring has a socket 26 for receiving the head of the screw, locking the screw in place in the clip and on the spring.

What I claim as new is:

1. In a wringer spring and adjusting screw assembly the combination with a flat spring and adjusting screw of a clip of resilient material having a screw receiving portion engaging the top surface of the spring and hooked flanges hooked around the edges of the spring, the clip having a resilience permitting the springing of the clip to place on the spring, and the clip including means securing the screw in position to exert pressure on the spring.

2. In a wringer spring and adjusting screw assembly the combination with a flat spring and adjusting screw having a head of a clip of resilient material having hooked flanges hooked around the edges of the spring, the clip having a resilience permitting the springing of the clip to place on the spring, and the clip including means securing the screw in position to exert pressure on the spring comprising a slot in the clip having an enlargement, the enlargement being adapted to receive the head and the slot the screw.

3. In a wringer spring and adjusting screw assembly the combination with a flat spring and adjusting screw having a head of a clip of resilient material having hooked flanges hooked around the edges of the spring, the clip having a resilience permitting the springing of the clip to place on the spring, and the clip including means securing the screw in position to exert pressure on the spring comprising a slot in the clip having an enlargement, the enlargement being adapted to receive the head and the slot the screw, the enlargement being positioned in a flange.

4. In a wringer spring and adjusting screw assembly the combination with a flat spring and adjusting screw having a head of a clip of resilient material having hooked flanges hooked around the edges of the spring, the clip having a resilience permitting the springing of the clip to place on the spring, and the clip including means securing the screw in position to exert pressure on the spring comprising a slot in the clip having an enlargement, the enlargement being adapted to receive the head and the slot the screw, and a depression in the spring receiving the head when locking the screw in the slot.

5. In a wringer spring and adjusting screw assembly the combination with a flat spring and adjusting screw having a head of a clip of resilient material having hooked flanges hooked around the edges of the spring, the clip having a resilience permitting the springing of the clip to place on the spring, and the clip including means securing the screw in position to exert pressure on the spring comprising a slot in the clip having an enlargement, the enlargement being adapted to receive the head and the slot the screw, the screw being insertable with the clip in place through the resilience of the clip.

6. In a wringer spring and adjusting screw assembly the combination with a flat spring and adjusting screw of a clip of resilient material having hooked flanges hooked around the edges of the spring, the clip having a resilience permitting the springing of the clip to place on the spring, and the clip including means securing the screw in position to exert pressure on the spring, one of said flanges having a slot from its lower edge permitting insertion of a tool for detachment of the clip.

WALTER L. KAUFFMAN, II.